(12) United States Patent
Song et al.

(10) Patent No.: US 11,003,887 B2
(45) Date of Patent: *May 11, 2021

(54) SHEET AND AN OPTICAL FINGERPRINT SCANNER (71) Applicant: LG Chem, Ltd., Seoul (KR)

(72) Inventors: Min Soo Song, Daejeon (KR); Jae Jin Kim, Daejeon (KR); Dae Han Seo, Daejeon (KR); Sang Choll Han, Daejeon (KR)

(73) Assignee: LG Chem, Ltd.

( * ) Notice: Subject to any disclaimer, the term of this patent is extended or adjusted under 35 U.S.C. 154(b) by 4 days.

This patent is subject to a terminal disclaimer.

(21) Appl. No.: 16/345,932

(22) PCT Filed: Nov. 30, 2017

(86) PCT No.: PCT/KR2017/013934
§ 371 (c)(1),
(2) Date: Apr. 29, 2019

(87) PCT Pub. No.: WO2018/101771
PCT Pub. Date: Jun. 7, 2018

(65) Prior Publication Data
US 2020/0082194 A1    Mar. 12, 2020

(30) Foreign Application Priority Data

Nov. 30, 2016  (KR) .................. 10-2016-0162148
Nov. 2, 2017   (KR) .................. 10-2017-0145403

(51) Int. Cl.
*G06K 9/00*    (2006.01)
*G02B 5/18*    (2006.01)
(Continued)

(52) U.S. Cl.
CPC .............. *G06K 9/0004* (2013.01); *G01L 1/00* (2013.01); *G02B 5/0252* (2013.01);
(Continued)

(58) Field of Classification Search
CPC .... G06K 9/0004; G06K 9/00; G06K 9/00046; G06K 9/2027; G02B 5/0252; G02B 6/00;
(Continued)

(56) References Cited

U.S. PATENT DOCUMENTS 5,061,463 A    10/1991   Vickery
5,986,746 A    11/1999   Metz et al.
(Continued)

FOREIGN PATENT DOCUMENTS

EP    2131322 A1    12/2009
EP    3239824 A1    11/2017
(Continued)

OTHER PUBLICATIONS

Extended European Search Report for Application No. 17875609.4 dated Oct. 4, 2019.
(Continued)

*Primary Examiner* — Amandeep Saini
(74) *Attorney, Agent, or Firm* — Lerner, David, Littenberg, Krumholz & Mentlik, LLP (57) ABSTRACT A sheet for optical fingerprint recognition or input, and a device including such a sheet. The sheet can detect fingerprint information having high contrast with a simple structure and can be applied to a large area display device to recognize a plurality of fingerprint patterns without being influenced by each other.

19 Claims, 2 Drawing Sheets (51) Int. Cl.
*G02B 5/32* (2006.01)
*G06F 3/0346* (2013.01)
*G06F 3/042* (2006.01)
*G06K 9/20* (2006.01)
*G02B 5/02* (2006.01)
*G01L 1/00* (2006.01)
*G02B 6/00* (2006.01)
*G02B 27/42* (2006.01)
*G06F 3/0484* (2013.01)
*G06F 3/0485* (2013.01)

(52) U.S. Cl.
CPC .............. *G02B 5/0289* (2013.01); *G02B 5/18* (2013.01); *G02B 5/32* (2013.01); *G02B 6/00* (2013.01); *G02B 27/4233* (2013.01); *G06F 3/0346* (2013.01); *G06F 3/042* (2013.01); *G06K 9/00* (2013.01); *G06K 9/00046* (2013.01); *G06K 9/2027* (2013.01); *G06F 3/0485* (2013.01); *G06F 3/04845* (2013.01); *G06F 2203/04104* (2013.01); *G06F 2203/04105* (2013.01)

(58) Field of Classification Search
CPC .... G02B 27/4233; G02B 5/0289; G02B 5/18; G02B 5/32; G01L 1/00; G06F 3/04845; G06F 3/0485; G06F 2203/04104; G06F 2203/04105; G06F 3/0428; G06F 3/0346; G06F 3/042
USPC ........................................................ 382/115
See application file for complete search history.

(56) References Cited

U.S. PATENT DOCUMENTS

| | | | |
|---|---|---|---|
| 10,192,096 | B2 | 1/2019 | Hu et al. |
| 2004/0252867 | A1 | 12/2004 | Lan et al. |
| 2010/0092047 | A1 | 4/2010 | Yamamoto et al. |
| 2015/0185393 | A1 | 7/2015 | Bang et al. |
| 2015/0310251 | A1 | 10/2015 | Wyrwas et al. |
| 2015/0347811 | A1 | 12/2015 | Kim |
| 2016/0070404 | A1 | 3/2016 | Kerr et al. |
| 2016/0247010 | A1 | 8/2016 | Huang et al. |
| 2016/0307025 | A1 | 10/2016 | Lee et al. |
| 2017/0270340 | A1 | 9/2017 | Gao et al. |
| 2017/0351850 | A1* | 12/2017 | Jin ...................... G06F 3/04817 |
| 2017/0351901 | A1* | 12/2017 | Kim .................. G06K 9/00046 |

FOREIGN PATENT DOCUMENTS

| | | |
|---|---|---|
| JP | 3011126 B2 | 2/2000 |
| JP | 2001059905 A | 3/2001 |
| JP | 2001283207 A | 10/2001 |
| JP | 2003050992 A | 2/2003 |
| JP | 2005130091 A | 5/2005 |
| JP | 2005228191 A | 8/2005 |
| JP | 2005524096 A | 8/2005 |
| JP | 2007164193 A | 6/2007 |
| KR | 20010106703 A | 12/2001 |
| KR | 20050000455 A | 1/2005 |
| KR | 20050020327 A | 3/2005 |
| KR | 20050076975 A | 7/2005 |
| KR | 20060112808 A | 11/2006 |
| KR | 20080095333 A | 10/2008 |
| KR | 20100012087 A | 2/2010 |
| KR | 20160054573 A | 5/2016 |
| WO | 2008123584 A1 | 10/2008 |
| WO | 2016010289 A1 | 1/2016 |

OTHER PUBLICATIONS

International Search Report in PCT/KR2017/013938, dated Feb. 7, 2018, 2 pages.

International Search Report in PCT/KR2017/013934 dated Mar. 8, 2018, 2 pages.

* cited by examiner

SHEET AND AN OPTICAL FINGERPRINT SCANNER

CROSS-REFERENCE TO RELATED APPLICATIONS

The present application is a national phase entry under 35 U.S.C. § 271 of International Application No. PCT/KR2017/013934, filed Nov. 30, 2017, published in Korean, which claims priority from Korean Patent Application No. 10-2016-0162148 filed on Nov. 30, 2016 and Korean Patent Application No. 10-2017-0145403 filed on Nov. 2, 2017, all of which are incorporated herein by reference.

TECHNICAL FIELD

The present application relates to a sheet usable for optical fingerprint recognition and a device comprising the same.

BACKGROUND ART

Depending on generalization and use frequency increase of portable mobile devices such as smartphones and tablet PCs, security of these devices is becoming more important. Especially, it is more important to maintain security in electronic commerce and banking fields using these devices. Biological information of a user, for example, fingerprint, iris, face, or voice, can be used to identify or authenticate a device user for security maintenance. In recent years, portable mobile devices to which a user authentication technology through the fingerprint is applied have also been commercialized.

On the other hand, fingerprint recognition methods can be classified into an optical method, an ultrasonic method, an electrostatic capacity method, an electric field measurement method and a heat sensing method, and the like. Among these, the optical fingerprint recognition method can be divided into a so-called scattering method for detecting light scattered in a ridge portion of a fingerprint in direct contact with a transparent fingerprint contact portion of the device, and a so-called total reflection method for detecting light totally reflected from the surface of a fingerprint contact portion corresponding to a valley portion of a fingerprint. In the former case, since light to be scattered must be detected, it may be difficult to provide a light quantity sufficient to identify the fingerprint pattern to the sensor, and the path of the scattered light may overlap the light path of the original light source, so that the contrast may be lowered. And, in the scattering method, a trapezoidal distortion caused by the light path difference also occurs. Devices having various structures have been proposed to solve the above problems through various papers and patents, but it cannot be said that the scattering method is not suitable for portable mobile devices because of the use of bulky prisms or the like. Also, in the latter case, there is an advantage that a greater light quantity can be secured than a method of detecting scattered light, but if the total reflection path is long in the process in which the totally reflected light toward the sensor repeats the total reflection along the waveguide, the lights totally reflected from adjacent fingerprints may interfere with each other to lower the contrast. In addition, when the conventional total reflection method is used, the size of the device can be increased due to the necessity of separately installing a sensor or a prism, and the like, and there is a problem that compatibility with the portable mobile device having a large area display is also poor, because input and output structures of the fingerprint recognition device are very limited, as the sensor is positioned at the opposite end of one end of the waveguide where the light source is positioned.

DISCLOSURE

Technical Problem

It is one object of the present application to provide a sheet for optical fingerprint recognition capable of detecting fingerprint information with high contrast and a device comprising the same.

It is another object of the present application to provide a sheet for optical fingerprint recognition which has a simple structure and is capable of simultaneously recognizing a plurality of fingerprints in a large area, and a device comprising the same.

The above objects of the present application and other objects can be all solved by the present application which is described in detail below.

Technical Solution

In order to solve the problems of the prior art described above and to achieve the above objects, the present application provides a sheet comprising, in a single layer, a first light control part capable of providing light always totally reflected from a surface layer of the sheet; and a second light control part capable of providing light whose total reflection is determined according to a fingerprint pattern in contact with the surface layer of the sheet to the surface layer of the sheet by changing a part of the light provided from the first light control part and totally reflected from the surface layer of the sheet at a predetermined angle and emitting it, and a device thereof.

Advantageous Effects

The present application can provide a sheet for optical fingerprint recognition that can provide fingerprint information with high contrast and recognize a plurality of fingerprint patterns without any influence on each other. In addition, the present application can provide a device capable of having a large-area sensor and a screen display device without being restricted by incidence and emission structures.

Hereinafter, a sheet according to one embodiment of the present application and a device comprising the same will be described in detail with reference to the accompanying drawings. For ease of explanation, the size or shape of each configuration shown may be exaggerated or reduced.

DETAILED DESCRIPTION OF THE DRAWINGS

In one example related to the present application, the present application relates to a sheet for optical fingerprint recognition or a sheet for fingerprint input. As described below, the sheet of the present application can be configured so that light derived from an external light source can be present (incident) on the sheet surface layer with two lights (rays) with different angles. One of the lights (rays) can be always totally reflected in the sheet, and the other can be identified by the sensor positioned on the lower part of the sheet, by being determined for total reflection at the surface layer of the sheet depending on a pattern of a material contacting the outside of the sheet, and reaching the lower part of the sheet or penetrating the sheet after being totally reflected.

Figure 1:
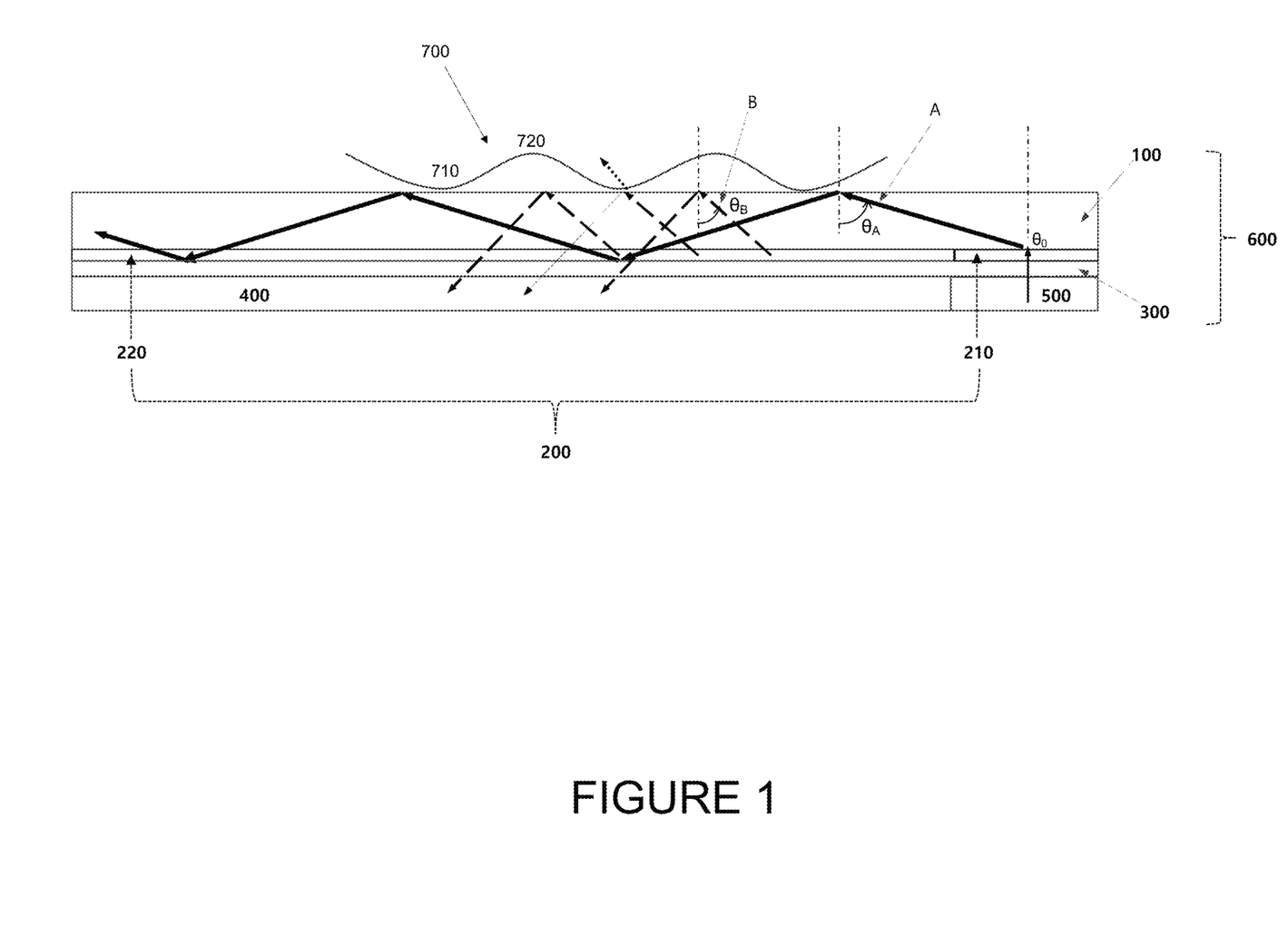
FIG. 1 schematically shows a cross-section of a sheet for optical fingerprint recognition according to one embodiment of the present application and a device comprising the same.

In this regard, FIG. 1 schematically shows a cross-section of a sheet 600 for optical fingerprint recognition (or input) according to one embodiment of the present application and a device comprising the same. The present application will be described with reference to FIG. 1 as follows.

The sheet 600 of the present application may comprise a lower base layer 300 and a light control layer 200 positioned on the lower base layer 300. In the present application, the term "on" or "above" used in connection with the interlayer lamination position may mean including not only the case where a configuration is formed directly on another configuration but also the case where a third configuration is interposed between these configurations.

The light control layer 200 comprises a first light control part 210 and a second light control part 220. The light control parts 210, 220 may be configurations provided so as to perform a predetermined function only on light incident at a specific angle. Accordingly, as described below, the first light control part 210 can provide light that always totally reflects to the surface layer of the sheet 600. Furthermore, the second light control part 220 can provide to the surface layer of the sheet light in which the total reflection is determined depending on a fingerprint pattern in contact with the sheet surface layer.

As shown in FIG. 1, the first light control part 210 can emit the light incident at a first incident angle ($\theta_0$) with respect to the lower surface of the first light control part 210 as the light (A) with a second incident angle ($\theta_A$) different from the first incident angle ($\theta_0$). In one example, the exit surface or the exit region of the first light control part 210, from which the light with the second incident angle ($\theta_A$) is emitted, may be any other surface or any inside region other than the lower surface of the first light control part 210. More specifically, the sheet 600 of the present application can be configured so that the light with the second incident angle ($\theta_A$) can be emitted from the side surface and/or upper surface of the first light control part 210 or any region and/or point inside the first light control part 210. In addition, the second light control part 220 can emit the light incident at a second incident angle ($\theta_A$) with respect to the upper surface of the second light control part 220 as the light (A) with a third incident angle ($\theta_A$) and the light (B) with a third incident angle ($\theta_B$) different from the second incident angle ($\theta_A$). In one example, the exit surface or the exit region of the second light control part 220, from which the light with the second incident angle ($\theta_A$) and the light with the third incident angle ($\theta_B$) are emitted, may be any other surface or any inside region other than the lower surface of the second light control part 220. More specifically, the sheet 600 of the present application can be configured so that the light (A) with the second incident angle ($\theta_A$) and the light (B) with the third incident angle ($\theta_B$) can be emitted from the side surface and/or upper surface of the second light control part 220 or any region and/or point inside the second light control part 220. In the present application, the unit of angle is ° (degree), and the term "incident angle" is an angle formed by the traveling direction of light from the normal to the sheet (or light-entering layer or light-entering surface) placed on the horizontal plane, which may have more than 0° to less than 90°. The term incident angle may also be referred to as an exit angle depending on the relative position of each configuration along the traveling direction of light. In the present application, the "lower surface" may mean one surface of a transparent base layer, a light control layer or a light control part which faces or contacts the lower base layer, and the "upper surface" may mean the opposite one surface of a transparent base layer, a light control layer or a light control part, having the relevant lower surface. The lower surface or the upper surface may be referred to as a light-entering surface or an incident surface, and a light-emitting surface or an exit surface, depending on the traveling path of light.

Since the light control layer 200 of the present application can be divided into two parts in which the angle or path of light, and the like can be controlled differently from each other as above, two lights (A and B) having different angles toward the transparent base layer positioned on the light control layer 200, specifically, with respect to the transparent base layer, and more specifically, with respect to the surface layer of the sheet 600, can be provided (emitted), as in FIG. 1. In the present application, the surface layer of the sheet may mean, for example, the upper surface of the transparent base layer in contact with air, or the upper surface of the transparent base layer in direct or indirect contact with an object having a pattern such as a fingerprint.

In one example, the sheet 600 of the present application may further comprise a transparent base layer that a fingerprint can contact directly or indirectly. When the sheet 600 comprises a transparent base layer, the transparent base layer may be located on the light control layer 200. That is, the sheet 600 may sequentially comprise a lower base layer 300, a light control layer 200 and a transparent base layer. In the present application, the term "transparent" used in relation to the properties of a configuration such as the layer may mean a case where the lower limit of the transmittance to visible light having a wavelength of 380 nm to 780 nm is 65% or more, 70% or more, 75% or more, 80% or more, 85% or more, 90% or more, or 95% or more, and the upper limit is about 100%, which is in a range of less than 100%.

In the case of comprising the transparent base layer, the first light control part 210 can emit the light incident on the lower surface of the first light control part 210 at the first incident angle ($\theta_0$) through the lower base layer 300 as the light with the second incident angle ($\theta_A$) different from the first incident angle ($\theta_0$) toward the transparent base layer. That is, the first light control part 210 can convert light incident at the first incident angle ($\theta_0$) with respect to the lower surface thereof into light with the second angle ($\theta_A$) to provide totally reflected light in the sheet 600. In one example, the light with the second incident angle ($\theta_A$) can be emitted from the upper surface and/or the side surface of the first light control part 210. Furthermore, when the transparent base layer is directly positioned on the light control layer 200, the lower surface of the transparent base layer can be the light incident surface with respect to the light with the second incident angle ($\theta_A$).

In the case of comprising the transparent base layer, the second light control part 220 can emit the light incident on the upper surface of the second light control part 220 at the second incident angle ($\theta_A$) through the transparent base layer after being totally reflected as the light (A) with the second incident angle ($\theta_A$) and the light (B) with the third incident angle ($\theta_B$) different from the second incident angle ($\theta_A$) toward the transparent base layer. In one example, the light with the second incident angle ($\theta_A$) and the light with the third incident angle ($\theta_B$) can be emitted from the upper surface and/or the side surface of the second light control part 220. That is, the second light control part 220 can convert a part of the light (A) having an incident angle of $\theta_A$ into the light (B) having an incident angle of $\theta_B$. The conversion degree, that is, the ratio, in which the light (A) incident at the angle $\theta_A$ is converted to the light (B) with the angle $\theta_B$, is not particularly limited, which may be suitably adjusted in a range of more than 0% to less than 100%. At this time, $\theta_A$ and $\theta_B$ may be an (incident) angle that the light emitted from the first light control part 210 and the light emitted from the second light control part 220 have each in the inside of the transparent base layer.

The information of the fingerprint 700 in contact with the transparent base layer can be read by the above configuration. Specifically, a path of light for allowing the fingerprint information to be read according to one example of the present application will be described as follows. That is, the light incident on the first light control part 210 from the light source via the lower base layer 300 is emitted as the light with the angle $\theta_A$ that can be always totally reflected from the upper surface of the transparent base layer into the inside of the sheet 600 by the first light control part 210, and the light with the angle $\theta_A$ emitted from the first light control part 210 is totally reflected from the upper surface of the transparent base layer irrespective of whether or not the fingerprint 700 and the transparent base layer contact, and is incident on the second light control part 220. And, the second light control part 220 converts a part of the light incident at the angle $\theta_A$ into the light with the angle $\theta_B$ and emits the light to the transparent base layer, and the remaining unconverted light is totally reflected from the upper surface of the lower base layer 300, for example, the interface between the light control layer 200 and the lower base layer 300. Thereafter, the light with the angle $\theta_B$ emitted to the transparent base layer is transmitted from the ridge 710 of the fingerprint 700, which is a contact portion of the transparent base layer and the fingerprint 700, and is totally reflected from the valley 720 of the fingerprint 700, which is a non-contact portion of the transparent base layer and the fingerprint 700. The light with the angle $\theta_B$ totally reflected from the valley portion of the fingerprint 700 and the transparent base layer and the fingerprint 700 can pass through the light control layer 200, reach the lower base layer 300 or penetrate it, and reach the sensor to be identified. In the present application, the term "interface" may mean a boundary surface between two adjacent layers, or a boundary surface between heterogeneous media placed on a path through which light passes. In addition, when the light with the angle $\theta_B$ penetrates the upper surface of the transparent base layer from the ridge 710 of the fingerprint 700, scattering and/or reflection may occur together with transmission.

According to one embodiment of the present application, in order to perform functions as above, the sheet of the present application may be constituted or provided as follows.

In one example, the first light control part 210 and the second light control part 220 may comprise each a diffractive optical element or a refractive optical element.

The refractive optical element may mean an element having a characteristic in which the traveling direction or angle of light is determined by the refractive index difference with the adjacent medium. When the light control part of the present application is a refractive optical element, the light control part may be configured in consideration of refractive indexes between the respective layers so as to satisfy the optical path described in the present application.

The diffractive optical element may mean an element having a characteristic in which the traveling direction or angle of light is determined by the shape of the pattern and the spacing between the patterns. When the light control part of the present application is a diffractive optical element, the light control part may be configured in consideration of refractive indexes between the respective layers and diffraction patterns so as to satisfy the optical path described in the present application.

In one example, the light control layer 200 of the present application may comprise a diffractive optical element. Specifically, the first light control part 210 and the second light control part 220 may comprise diffractive optical elements having different functions from each other, where the diffractive optical element may be a holographic optical element (HOE) in the form of a film. The holography is a technique for recording an interference pattern in a photosensitive medium to reproduce a three-dimensional image called a hologram. Also, the holographic film may mean a film on which a holographic recording is recorded, and may mean a film capable of recording an interference pattern on a film having very small photosensitive particles using recording light and reproducing it using reproduction light. Since the holographic film may perform the function only for the recorded light and may not perform the required function for light other than the recorded light, when the holographic film is used for the first light control part 210 and the second light control part 220, it is particularly advantageous to adjust the angle, the optical path and/or the light quantity of light required in the present application.

The holographic film may comprise a photosensitive material as a recording medium. As the photosensitive material, a photopolymer, a photoresist, a silver halide emulsion, a dichromated gelatin, a photographic emulsion, a photothermoplastic or a photorefractive material, and the like can be used. In one example, the holographic film may comprise a photopolymer as a photosensitive material, and may be, specifically, a film consisting only of a photopolymer, or a film with a double-layered structure comprising a photopolymer layer and a substrate for the layer together. In this case, the substrate used together with the photopolymer may be a transparent substrate and may be, for example, a substrate comprising polycarbonate (PC), polypropylene (PP), polyamide (PA), polyethylene terephthalate (PET) or triacetyl cellulose (TAC), and the like, but is not particularly limited.

In one example, the diffraction efficiencies of the first light control part 210 and the second light control part 220 may be the same or different from each other. Specifically, the first light control part 210 may have the same diffraction efficiency in its entire area and the second light control part 220 may also have the same diffraction efficiency in its entire area, where the diffraction efficiencies of the light control parts 210, 220 may be the same or different from each other.

In one example, the first light control part 210 and the second light control part 220 may be some regions formed by changing only angles or diffraction patterns of recording light on one layer, respectively. Alternatively, the light control layer 200 may also be formed by directly attaching the first light control part 210 and the second light control part 220 or by attaching them via another medium, so that the first light control part 210 and the second light control part 220, which are separately manufacture, may form a single layer.

When the transmittance described above is satisfied, the kind of the transparent base layer is not particularly limited. For example, it may comprise glass or a polymer resin. As the polymer resin, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene) may be used, without being limited thereto. In one example, the transparent base layer may have a configuration in which a number of glass or polymer resins are laminated. Even in the case of having such a laminated structure, the transparent base layer may be provided so as to perform the functions required in the present application and satisfy the following relational expressions.

In one example, the lower base layer 300 may be a pressure-sensitive adhesive layer satisfying refractive indexes to be described below and relational expressions to be defined in the present application. The kind or composition of the pressure-sensitive adhesive layer is not particularly limited and may be, for example, an acrylic pressure-sensitive adhesive layer or a silicone pressure-sensitive adhesive layer. In another example, the lower base layer 300 may further comprise, in addition to the pressure-sensitive adhesive material, the above-described transparent resin film, where these may function as a substrate for the pressure-sensitive adhesive material, or may be used for the purpose of imparting other functions. Even in the case of having such a configuration, the lower base layer 300 may be provided so as to perform the function required in the present application and satisfy the following relational expressions.

In the present application, the lower base layer 300, the light control layer 200 and the transparent base layer may have the same or different refractive indexes. In one example, the layers may each independently have a refractive index in a range of more than 1 to 5 or less, or more than 1 to 3 or less, and the interlayer refractive index difference may be 0.0001 to 2 or less. In the case of the light control layer 200, the refractive indexes of the first light control part 210 and the second light control part 220 can be adjusted to be the same or different in a range that can perform the functions required in the present application.

In one example, the refractive index of the lower base layer 300 may be less than the refractive index of the light control layer 200 and/or the refractive index of the transparent base layer. That is, the lower base layer 300 may be a low refractive layer. Although not particularly limited, when the refractive index relationship is satisfied, the refractive index difference between the lower base layer 300 and the light control layer 200 may be 0.1 or less.

In one example, the transparent base layer may have a higher refractive index than the light control layer 200. Although not particularly limited, when the refractive index relationship is satisfied, the refractive index difference between the transparent base layer and the light control layer 200 may be 0.05 or less.

In the present application, the thicknesses of the lower base layer 300, the light control layer 200, the transparent base layer, or other constituents that may be contained therein is not particularly limited. For example, if the function of the sheet described in the present application is exerted, the thickness of the structure is not limited, where for example, the lower limit may be 0.1 µm or more, or 1 µm or more and the upper limit may be 1,000 µm or less or 500 µm or less.

The sheet 600 of the present application may be configured such that the light with the angle $\theta_A$ always totally reflected in the sheet 600 may be present. That is, the light with $\theta_A$ can be always totally reflected from the upper surface of the transparent base layer, and the light with $\theta_A$ can also be totally reflected from the upper surface of the transparent base layer, can pass through the light control layer 200 from the transparent base layer and can be totally reflected from the upper surface of the lower base layer 300, for example, the interface between the light control layer 200 and the lower base layer 300.

Specifically, the sheet 600 of the present application can be configured so that the light with the angle $\theta_A$ emitted from the first light control part 210 toward the transparent base layer satisfies the following relational expressions 1 and 2. The relational expressions described below can be obtained using Snell's law.

$$\theta_A > (180°/\pi) \times \sin^{-1}(n_0/n_1) \qquad \text{[Relational Expression 1]}$$

Relational Expression 1 above exemplarily defines the condition that the light with the angle $\theta_A$ traveling from the transparent base layer to the air side is totally reflected from the upper surface of the transparent base layer, for example, the interface between the transparent base layer and the air layer. In Relational Expression 1 above, $n_0$ is 1 as the refractive index of air, and $n_1$ is the refractive index of the transparent base layer.

$$\theta_A > (180°/\pi) \times \sin^{-1}(n_3/n_1) \qquad \text{[Relational Expression 2]}$$

Relational Expression 2 above exemplarily defines the condition that the light with the angle $\theta_A$ totally reflected from the upper surface of the transparent base layer passes through the light control layer 200 from the transparent base layer and is totally reflected from the upper surface of the lower base layer 300 such as the interface between the light control layer 200 and the lower base layer 300. In Relational Expression 2 above, $n_1$ is the refractive index of the transparent base layer, and $n_3$ is the refractive index of the lower base layer 300.

In one example, in order to satisfy Relational Expression 2 above, the light with the angle $\theta_A$ totally reflected from the upper surface of the transparent base layer must penetrate the transparent base layer and/or the upper surface of the light control layer 200. For example, when the refractive index of the transparent base layer is larger than the refractive index of the light control layer 200, the total reflection should not occur at the upper surface of the light control layer 200, for example, the interface between the transparent base layer and the light control layer 200, and thus $\theta_A$ must satisfy the following relational expression 3.

$$\theta_A < (180°/\pi) \times \sin^{-1}(n_2/n_1) \qquad \text{[Relational Expression 3]}$$

Relational Expression 3 above exemplarily defines the condition that the total reflection does not occur at the interface between the transparent base layer and the light control layer 200. In Relational Expression 3 above, $n_1$ is the refractive index of the transparent base layer, $n_2$ is the refractive index of the first light control part 210 or the second light control part 220 in the light control layer 200, and $n_1$ is larger than $n_2$.

In the present application, the light with the angle $\theta_A$ may be light totally reflected from the upper surface (contact surface) of the transparent base layer where the transparent base layer and an object contact directly, even when the object having a pattern with a different height contacts the transparent base layer. In order to satisfy this, the angle $\theta_A$ of the light emitted from the first light control part 210 may satisfy, for example, the following relational expression 4.

$$\theta_A > (180°/\pi) \times \sin^{-1}(n_h/n_1) \quad \text{[Relational Expression 4]}$$

In Relational Expression 4 above, $n_1$ is the refractive index of the transparent base layer, and $n_h$ is the refractive index of the portion whose the object having a pattern with a different height is in direct contact with the transparent base layer. At this time, the object having a pattern with a different height may be a fingerprint 700 and the portion whose the object having a pattern with a different height is in direct contact with the transparent base layer may be a ridge 710 of the fingerprint 700. On the other hand, the non-contact portion of the object having a pattern with a different height with the transparent base layer may be a valley 720 of the fingerprint 700, and since the valley portion is occupied by the air, the refractive index of the valley portion can be regarded as 1 ($=n_0$).

As described above, in the present application, the sheet 600 is provided so as to be capable of providing the totally reflected light always totally reflected in the sheet 600 so that the light with the angle ($\theta_A$) provided from the first light control part 210 satisfies the predetermined relational expressions. On the other hand, in the present application, the light with the angle ($\theta_A$) is light in which the total reflection is performed irrespective of whether or not the fingerprint 700 contacts, so that the light quantity in the sheet 600 can be maintained at a certain level. And, as described below, since the light with the angle ($\theta_B$) used for fingerprint recognition originates from the light with the angle ($\theta_A$), the light with the angle ($\theta_B$) for generating the fingerprint image can also have a light quantity kept constant in the sheet 600 irrespective of whether or not the fingerprint 700 contacts.

In the present application, the second light control part 220 may be a configuration to provide light (B) generated regardless of whether or not the fingerprint 700 contacts.

Specifically, the second light control part 220 may be a configuration to provide light with an angle ($\theta_B$) at which the total reflection on the upper surface of the transparent base layer is determined depending on the presence or absence of an object existing on the transparent base layer. That is, the light with the angle ($\theta_B$) may be light that when the object does not exist on the transparent base layer, it is totally reflected from the upper surface of the transparent base layer, for example, the interface between the transparent base layer and the air, but when the object having a pattern with a different height contacts the transparent base layer, it is transmitted (or transmission, scattering, and reflection can occur at the same time) from a direct contact portion (ridge) of the object with respect to the transparent base layer.

In one example, the sheet 600 of the present application may be provided so that the light with the angle ($\theta_B$) may be totally reflected from the upper surface of the transparent base layer, for example, the interface between the transparent base layer and the air, by satisfying the following relational expression 5. And, when the object having a pattern with a different height contacts the transparent base layer, it may be configured so that the light with the angle ($\theta_B$) may be transmitted (or transmission, scattering, and reflection can occur at the same time) from the upper face portion of the transparent base layer in direct contact with the object, by satisfying the following relational expression 6.

$$\theta_B > (180°/\pi) \times \sin^{-1}(n_0/n_1) \quad \text{[Relational Expression 5]}$$

$$\theta_B < (180°/\pi) \times \sin^{-1}(n_h/n_1) \quad \text{[Relational Expression 6]}$$

In Relational Expressions 5 and 6 above, $n_0$ is 1 as the refractive index of air, $n_1$ is the refractive index of the transparent base layer, and $n_h$ is a refractive index of a ridge portion in direct contact with the transparent base layer in the object having a pattern with a different height. As described above, since the valley portion in the object having a pattern with a different height, which is a non-contact portion with the transparent base layer, is occupied by the air, the refractive index of the non-contact portion can be regarded as 1 ($=n_0$).

Furthermore, in the present application, the sheet 600 may be provided such that the light with the angle ($\theta_B$) emitted from the second light control part 220 and incident on the transparent base layer may be totally reflected from the upper surface of the transparent base layer and then penetrate the upper surface of the light control layer 200. When the refractive index of the transparent base layer is larger than the refractive index of the light control layer 200, the total reflection must not occur at the interface between the transparent base layer and the light control layer 200, so that the angle $\theta_B$ can satisfy the following relational expression 7.

$$\theta_B < (180°/\pi) \times \sin^{-1}(n_2/n_1) \quad \text{[Relational Expression 7]}$$

Relational Expression 7 above exemplarily defines a condition in which the total reflection does not occur at the interface between the transparent base layer and the light control layer 200. In Relational Expression 7 above, $n_1$ is the refractive index of the transparent base layer, $n_2$ is the refractive index of the first light control part 210 or the second light control part 220 in the light control layer 200, and $n_1$ is larger than $n_2$.

In addition, the sheet 600 of the present application may be provided so that when the light with the angle $\theta_B$ emitted from the second light control part 220 is totally reflected from the upper surface of the transparent base layer, it can reach the lower base layer 300 or penetrate the lower base layer 300. The light reaching the lower base layer 300 or penetrating the lower base layer 300 can be recognized by the sensor. In order that the light capable of being recognized by the sensor is present in the sheet 600, when the light with $\theta_B$ is totally reflected from the surface layer of the transparent base layer and enters the upper surface of the lower base layer 300 via the transparent base layer and the light control layer 200, the total reflection should not occur at the interface between the light control layer 200 and the lower base layer 300. In this connection, $\theta_B$ can satisfy the following relational expression 8.

$$\theta_B < (180°/\pi) \times \sin^{-1}(n_3/n_1) \quad \text{[Relational Expression 8]}$$

Relational Expression 8 above exemplarily defines a condition that the light reaching the lower surface of the lower base layer 300 is present. In Relational Expression 8 above, $n_1$ is the refractive index of the transparent base layer, and $n_3$ is the refractive index of the lower base layer 300.

When the angle $\theta_B$ of the light totally reflected from the upper surface of the transparent base layer as above satisfies Relational Expressions 7 and 8 above, the sensor existing in the lower part of the sheet 600 can recognize the light reaching the lower base layer 300 or penetrating the lower base layer 300, as shown in FIG. 1. That is, the sheet 600 of the present application allows the user's fingerprint to be recognized using a method of identifying a difference in light quantity between the light totally reflected from the upper surface of the transparent base layer in contact with air and the light transmitted (or transmission, scattering and reflection can occur at the same time) from the contact portion of the transparent base layer and the object among the light with an angle ($\theta_B$) emitted from the second light control part 220.

As such, the present application does not directly use the light always totally reflected in the sheet 600 for fingerprint identification. Specifically, when a part of the light with the angle $\theta_A$ provided from the first light control part 210 is converted into the light with the angle $\theta_B$ different from $\theta_A$ by the second light control part 220 and emitted toward the transparent base layer, so that the always totally reflected light may exist, and the light emitted toward the transparent base layer at the incident angle $\theta_B$ is totally reflected from the upper surface of the transparent base layer in contact with an external object to the inside of the sheet 600 and transmitted (or transmission, scattering and reflection can occur at the same time) to the outside of the sheet 600, the present application uses the light quantity difference of these lights for fingerprint identification. That is, the difference between the light quantity of the light totally reflected from the non-contact portion with the fingerprint 700 and traveling to the sensor and the light quantity of the light transmitted (or transmission, scattering and reflection can occur at the same time) from the contact portion with the fingerprint 700 and reduced, among the lights at the angle $\theta_B$, is used for fingerprint identification.

Furthermore, in the present application, the light with the angle $\theta_B$ is generated from the light always totally reflected in the sheet 600 regardless of the presence or absence of the fingerprint 700. Therefore, in the present application, the light quantity of the light used for identifying the fingerprint 700 can be kept constant by using the light always totally reflecting the inside of the sheet 600, and consequently, the light quantity difference between the light totally reflected from the interface of the transparent base layer and the air, and the light transmitted (or transmission, scattering and reflection can occur at the same time) from the direct contact portion of the transparent base layer and the object, among the lights with the angle ($\theta_B$), can be more clearly recognized by the sensor. Besides, in the present application, the light totally reflected from the interface between the transparent base layer and the air and the light transmitted (or transmission, scattering and reflection can occur at the same time) from the contact portion of the transparent base layer and the object, among the lights with the angle ($\theta_B$) generated regardless of the presence or absence of the fingerprint 700, are used for fingerprint identification, so that even if a number of fingerprint patterns are in contact with the transparent base layer, they can be identified without being influenced by each other.

In one example, a projected area (S1) of the first light control part 210 may be smaller than a projected area (S2) of the second light control part 220. In the present application, the term "projected area" may mean, on observing the sheet 600 from the upper part or the lower part in a direction parallel to the normal direction of its surface, an area in which the relevant configuration is viewed, and for example, an orthogonal projection area. Therefore, the increase or decrease of the actual area due to the unevenness of the area comparison target configuration or the like is not considered. Although not particularly limited, S1:S2 may be in a range of 5 to 40:60 to 95.

In another example related to the present application, the present application relates to an optical fingerprint recognition device (fingerprint scanner) or a fingerprint input device.

In one example, the device may further comprise a light source part 500. The light source part means a configuration capable of radiating light toward the sheet 600. The specific configuration of the light source part is not particularly limited as long as the above function can be performed. As in FIG. 1, the light source part 500 may be located on one surface of the sheet 600 lower base layer 300, more specifically, on the opposite one surface of one surface of the lower base layer 300 where the first light control part 210 contacts. The light incident from the light source part 500 is incident on the first light control part 210 of the light control layer 200 via the lower base layer 300, whereby the light that can be always totally reflected in the sheet 600 can be provided to the sheet 600. In one example, the light incident on the first light control part 210 may be vertical to the bottom surface of the first light control part 210. In the present application, the term "vertical" means a substantial verticalness in a range that does not impair the desired effect, which is used, for example, in consideration of manufacturing error or variation, and the like. At this time, the error or variation may be within ±10°, within ±8°, within ±6°, within ±4°, within ±2°, within ±1°, within ±0.5°, within ±0.2°, or within ±0.1°. In the case of the device comprising the sheet having the above configuration, even if a light source of a small area is used, the above-described fingerprint recognition function can be sufficiently performed. In one example, the small area may be an area corresponding to or smaller than the first light control part 210.

In one example, the device may further comprise a sensor part 400. The sensor part may mean a configuration for sensing the light penetrating the lower base layer 300. The configuration of the sensor part is not particularly limited as long as the above function can be performed, where a known sensor can be used. As in FIG. 1, the sensor part 400 may be located on one surface of the sheet lower base layer 300, more specifically, on the opposite one surface of one surface of the lower base layer 300 in which the second light control part 220 contacts. As described above, the light totally reflected in the transparent base layer portion that directly contacts the fingerprint 700, except for the totally reflected light in the sheet 600, can penetrate the lower base layer 300 to reach the sensor part 400, where the sensor part 400 can recognize the pattern of the object contacting the transparent base layer, that is, the fingerprint 700, based on the light quantity difference of the reached lights. In one example, the sensor part 400 may be provided to have a transparent property. In another example, the sensor part 400 may have an area corresponding to the second light control part 220.

In one example, the device may further comprise a screen display part. The screen display part may be, for example, a configuration such that an image or a moving image reproduced by the device can be viewed by the user. As in FIG. 1, the screen display part may be positioned on one surface of the sheet lower base layer 300, more specifically, the opposite one surface of one surface of the lower base layer 300 where the second light control part 220 contacts. In one example, the screen display part may have an area corresponding to the second light control part 220.

In another example, the device may simultaneously comprise a screen display part and a sensor part. In this case, the device may sequentially comprise a screen display part, a sensor part and a sheet, or may sequentially comprise a sensor part, a screen display part and a sheet. In addition, any one of the screen display part and the sensor part may also form one layer with the light source part.

In another example, the device may further comprise one part for performing a display function and a sensor function at the same time. In this case, the one part may also form one layer with the light source part.

Figure 2:
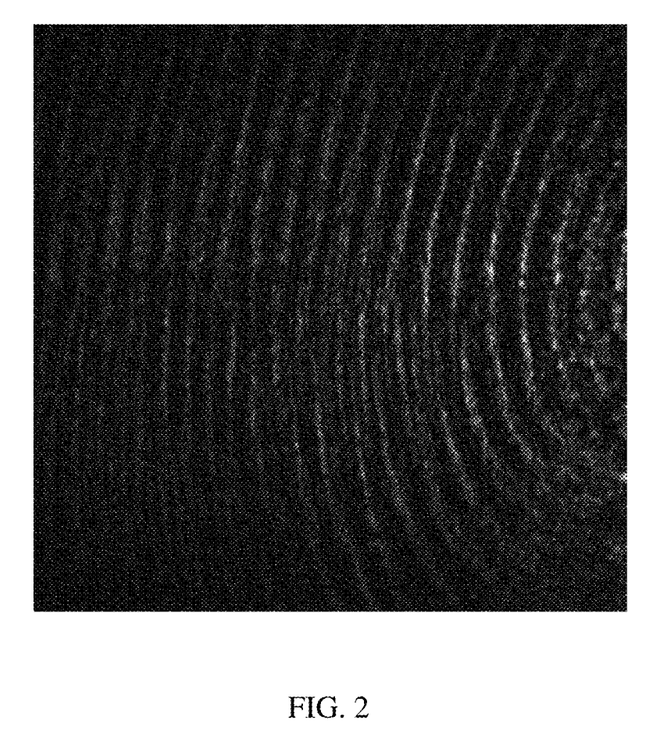
FIG. 2 is an image of a fingerprint photographed using a sheet according to one embodiment of the present application.

FIG. 2 is an image of a fingerprint photographed using a sheet according to one embodiment of the present application. As the sheet used for photographing, a laminate sequentially comprising a lower base layer having a refractive index of 1.41 for light having a wavelength of 532 nm, a light control layer including a holographic film having a refractive index of 1.50 for light having a wavelength of 532 nm and a glass base layer (cover glass) having a refractive index of 1.51 for light having a wavelength of 532 nm was used. In the case of the light control layer, it was produced using a known photopolymer film. Specifically, a diffraction pattern was recorded on the light control layer, so that the first light control part could emit the incident light with 73° based on the normal to the sheet (transparent base layer) and the second light control part could emit some of the incident light with an angle of 45° based on the normal to the sheet (transparent base layer. Thereafter, the sheet was irradiated with an external light with 0° based on the normal to the sheet (transparent base layer), and the image appearing at the bottom of the lower base layer by contacting a fingerprint with the surface of the transparent base layer was photographed with a CCD (charge-coupled device).

As described above, the invention of the present application has been described with reference to FIGS. 1 and 2 which are exemplary embodiments of the present application, but the scope of protection of the present invention is not limited to the above-described specific embodiments and drawings. In addition, it will be understood by those having ordinary knowledge in the technical field to which the present technical field pertains that the inventions described in the claims can be changed or modified variously within the technical spirit and scope of the present invention as filed.

The invention claimed is:

1. An optical sheet comprising plurality of layers, the plurality of layers including:
   a lower base layer;
   a light control layer positioned on the lower base layer and having a first portion of the light control layer and a second portion of the light control layer; and
   a transparent base layer positioned on the light control layer,
   wherein the first portion of the light control layer is adapted to emit light incident on the lower surface of the first portion of the light control layer at a first incident angle ($\theta_O$) as light with a second incident angle ($\theta_A$) different from the first incident angle ($\theta_O$), and
   wherein the second portion of the light control layer is adapted to emit light incident on the upper surface of the second portion of the light control layer at the second incident angle ($\theta_A$) as light with the second incident angle ($\theta_A$) and light with a third incident angle ($\theta_B$) different from the second incident angle ($\theta_A$).

2. The sheet according to claim 1, wherein the first portion of the light control layer is provided so as to emit the light incident on the lower surface of the first portion of the light control layer at the first incident angle ($\theta_O$) through the lower base layer as the light with the second incident angle ($\theta_A$) different from the first incident angle ($\theta_O$) toward the transparent base layer, and
   wherein the second portion of the light control layer is provided so as to emit the light incident on the upper surface of the second portion of the light control layer at the second incident angle ($\theta_A$) through the transparent base layer as the light with the second incident angle ($\theta_A$) and the light with the third incident angle ($\theta_B$) different from the second incident angle ($\theta_A$) toward the transparent base layer.

3. The sheet according to claim 2, wherein the first portion of the light control layer and the second portion of the light control layer comprise each a diffractive optical element or a refractive optical element.

4. The sheet according to claim 3, wherein each of the first portion of the light control layer and the second portion of the light control layer comprises a respective holographic film.

5. The sheet according to claim 3, wherein the lower base layer has a refractive index smaller than a refractive index of the light control layer.

6. The sheet according to claim 5, wherein a difference between the refractive index of the lower base layer and the refractive index of the light control layer is 0.1 or less.

7. The sheet according to claim 5, wherein the lower base layer comprises an acrylic transparent pressure-sensitive adhesive layer or a silicone transparent pressure-sensitive adhesive layer.

8. The sheet according to claim 5, wherein the transparent base layer has a refractive index larger than the refractive index of the light control layer.

9. The sheet according to claim 8, wherein a difference between the refractive index of the transparent base layer and the refractive index of the light control layer is 0.05 or less.

10. The sheet according to claim 8, wherein the transparent substrate layer comprises glass or a polymer resin.

11. The sheet according to claim 2, wherein the sheet is provided such that the light with the angle ($\theta_A$) emitted from the first portion of the light control layer can be totally reflected from both of the upper surface of the transparent base layer and the upper surface of the lower base layer by satisfying:

$$\theta_A > (180°/\pi) \times \sin^{-1}(n_O/n_1)$$

and: $\theta_A > (180°/\pi) \times \sin^{-1}(n_3/n_1)$ wherein, $n_O$ is the refractive index of air, $n_1$ is the refractive index of the transparent base layer and $n_3$ is the refractive index of the lower base layer.

12. The sheet according to claim 11, wherein the sheet is provided such that the light with the angle ($\theta_A$) emitted from the first portion of the light control layer can be totally reflected from the upper surface of the transparent base layer and then penetrate the upper surface of the light control layer by satisfying:

$$\theta_A < (180°/\pi) \times \sin^{-1}(n_2/n_1)$$

wherein, $n_1$ is the refractive index of the transparent base layer, $n_2$ is the refractive index of the first portion of the light control layer or the second portion of the light control layer in the light control layer, and $n_1$ is larger than $n_2$.

13. The sheet according to claim 12, wherein when an object having a pattern with a different height contacts the transparent base layer, the sheet is provided such that the light with the angle ($\theta_A$) emitted from the first portion of the light control layer is totally reflected from the upper surface of the transparent base layer that the transparent base layer and the object contact directly by satisfying:

$$\theta_A > (180°/\pi) \times \sin^{-1}(n_h/n_1)$$

wherein, $n_1$ is the refractive index of the transparent base layer and $n_h$ is the refractive index of the portion whose the object having a pattern with a different height is in direct contact with the transparent base layer.

14. The sheet according to claim 13, wherein when the object having a pattern with a different height contacts the transparent base layer, the sheet is provided such that the light with the angle ($\theta_B$) emitted from the second portion of the light control layer can be totally reflected from the upper surface of the transparent base layer in contact with air by satisfying the following relational expression 5 and the light with the angle ($\theta_B$) emitted from the second portion of the light control layer can be transmitted from the upper surface of the transparent base layer that the transparent base layer and the object contact directly by satisfying:

$$\theta_B > (180°/\pi) \times \sin^{-1}(n_0/n_1)$$

and: $\theta_B < (180°/\pi) \times \sin^{-1}(n_h/n_1)$ wherein, $n_0$ is the refractive index of air, $n_1$ is the refractive index of the transparent base layer and $n_h$ is the refractive index of the portion whose the object having a pattern with a different height is in direct contact with the transparent base layer.

15. The sheet according to claim 1, wherein the sheet is provided such that the light with the angle ($\theta_B$) emitted from the second portion of the light control layer can be totally reflected from the upper surface of the transparent base layer and then penetrate the upper surface of the light control layer by satisfying:

$$\theta_B < (180°/\pi) \times \sin^{-1}(n_2/n_1)$$

wherein, $n_1$ is the refractive index of the transparent base layer, $n_2$ is the refractive index of the first portion of the light control layer or the second portion of the light control layer in the light control layer and $n_1$ is larger than $n_2$.

16. The sheet according to claim 15, wherein the sheet is provided such that the light with the angle ($\theta_B$) emitted from the second portion of the light control layer can be totally reflected from the upper surface of the transparent base layer, pass through the light control layer and reach the lower surface of the lower base layer by satisfying:

$$\theta_B < (180°/\pi) \times \sin^{-1}(n_3/n_1)$$

wherein, $n_1$ is the refractive index of the transparent base layer and $n_3$ is the refractive index of the lower base layer.

17. The sheet according to claim 1, wherein the sheet is configured to be used for optical fingerprint recognition or optical fingerprint input.

18. An optical fingerprint recognition or input device comprising:
the sheet according to claim 1; and
a light source in contact with a surface of the lower base layer opposite the light control layer,
wherein the light source is configured to transmit vertical light towards the first portion of the light control layer.

19. The optical fingerprint recognition or input device according to claim 18, further comprising at least one of a screen display or a sensor.

* * * * *